United States Patent
Arcella et al.

(10) Patent No.: US 6,896,777 B2
(45) Date of Patent: May 24, 2005

(54) POROUS HYDROPHILIC MEMBRANES

(75) Inventors: Vincenzo Arcella, Milan (IT); Alessandro Ghielmi, Milan (IT)

(73) Assignee: Solvay Solexis S.p.A., Milan (IT)

(*) Notice: Subject to any disclaimer, the term of this patent is extended or adjusted under 35 U.S.C. 154(b) by 467 days.

(21) Appl. No.: 10/080,555

(22) Filed: Feb. 25, 2002

(65) Prior Publication Data

US 2002/0144899 A1 Oct. 10, 2002

(30) Foreign Application Priority Data

Feb. 26, 2001 (IT) ...................................... MI2001A0383

(51) Int. Cl.$^7$ .......................... C25B 13/00; H01M 8/10; C08J 5/20
(52) U.S. Cl. ........................... 204/296; 429/30; 429/33; 429/199; 429/203; 429/204; 429/309; 429/310; 429/314; 429/316; 429/321; 521/27
(58) Field of Search .......................... 521/27; 204/296; 429/30, 33, 199, 203, 204, 309, 310, 314, 316, 321

(56) References Cited

U.S. PATENT DOCUMENTS

| | | | |
|---|---|---|---|
| 4,035,565 A | 7/1977 | Apotheker et al. | 526/249 |
| 4,243,770 A | 1/1981 | Tatemoto et al. | 525/331 |
| 4,564,662 A | 1/1986 | Albin | 526/247 |
| 4,694,045 A | 9/1987 | Moore | 525/276 |
| 4,745,165 A | 5/1988 | Arcella et al. | 526/247 |
| 4,943,622 A | 7/1990 | Naraki et al. | 526/206 |
| 4,954,388 A | 9/1990 | Mallouk et al. | 428/198 |
| 5,091,086 A | * 2/1992 | Stengaard | 210/490 |
| 5,173,553 A | 12/1992 | Albano et al. | 526/238 |
| 5,447,636 A | 9/1995 | Banerjee | 210/638 |
| 5,635,041 A | 6/1997 | Bahar et al. | 204/282 |
| 6,146,747 A | * 11/2000 | Wang et al. | 428/310.5 |
| 6,179,132 B1 | * 1/2001 | Moya | 210/490 |

FOREIGN PATENT DOCUMENTS

| | | |
|---|---|---|
| EP | 0 136 596 | 4/1985 |
| EP | 0 199 138 | 10/1986 |
| EP | 0 410 351 A1 | 1/1991 |
| EP | 1 004 615 A2 | 5/2000 |
| WO | WO 97/40924 | 11/1997 |
| WO | WO 99/38897 | 8/1999 |
| WO | WO 00/61267 | 10/2000 |

* cited by examiner

Primary Examiner—Bruce F. Bell
(74) Attorney, Agent, or Firm—Arent Fox, PLLC

(57) ABSTRACT

Porous hydrophilic membranes comprising a porous inert support on which an ionomer is deposited, said membranes being characterized in that they have an ionic conductivity and a water permeability higher than 1 l/(h.m$^2$.Atm).

25 Claims, No Drawings

POROUS HYDROPHILIC MEMBRANES

FIELD OF THE INVENTION

The present invention relates to hydrophilic membranes and a process for preparing them, said membranes having a high water permeability, being easily wettable by water, and in the wet state they show a much lower permeability to gases than the not wetted membrane, and used as membranes for fuel cells or electrolytic cells they show a high conductivity.

More specifically the membranes of the present invention comprise an inert porous support, preferabaly based on fluorinated polymers comprising a fluorinated ionomer, preferably having —$SO_3H$ functions.

The membranes of the invention, being characterized by a high water permeability, are particular suitable to be used as proton exchange memberanes, for example in fuel cells or in membranes reactors since the high water permeability allows to obtain improved cells. In fact it is well known that one of the most important problems for the good functioning of the fuel cells is the membrane drying at the anode side and the excessive membrane hydration from the cathode side. A better permeability of the membrane to water allows to reduce these drawbacks. Besides an improved water permeability of the membrane allows to obtain a lower resistance to proton transport of the membrane and therefore even a higher conductivity of the membrane in the cells.

BACKGROUND OF THE INVENTION

In the prior art (U.S. Pat. No. 6,179,132), porous membranes for filtration, and not for fuel cells, are described; they comprise a porous perfluoropolymer substratum having the surface completely modified by a perfluorocarbon copolymer directly bound to the substratum, the perfluorocarbon copolymer having hydrophilic groups directly wettable at contact with water. In said patent it is stated that the perfluoropolymer surface is rendered hydrophilic without compromising the substratum inertia and without meaningfully decreasing the substratum porosity. The copolymer is deposited on the perfluoropolymer from a substantially aqueous solution to obtain a perfluoropolymer surface directly wettable with water. This directly wettable surface modified according to the process described in said patent differs from the surfaces described in the prior art modified with perfluorocarbon polymers, deposited from a solution of water and an organic solvent or of an organic solvent alone, since the surfaces are not directly wettable at contact with water. Besides the described surfaces modified according to the prior art require a complex pretreatment (organic solvent or shear) to allow the surface wetting with water. The porous membranes of said patent do not show the dewetting phenomenon. The support surface according to said patent is not coated by a coating but it is only modified. Said membranes show water permeability, but they cannot be used in fuel cells since tests carried out by the Applicant show that they do not show substantial ionic conductivity.

The proton exchange membranes, for example those for fuel cells, should show a high proton exchange capability (conductivity) combined with a high water permeability. The membranes at present used are Nafion® based and show a good conductivity, sufficient for the use in stationary plants, but not deemed suitable for the car field. Besides the water permeability is substantially absent. To improve the proton transport and therefore the membrane conductivity, membranes having a reduced thickness are used. However these thicknesses cannot be lower than about 100 microns in order not to jeopardize the mechanical stability of the membrane. Furthermore it is to be noted that the water permeability also of these membranes is very low. To further reduce the membrane thickness, composite membranes are known wherein an ionomer is deposited on a support which guarantees the mechanical stability thereof. It is thus possible to obtain thicknesses lower than 100 microns. For example membranes having a thickness lower than 50 microns have been obtained by using as a support bistretched PTFE having a high porosity. However these membranes have the drawback to have also in this case a water permeability substantially absent.

All the membranes for fuel cells of the prior art or available on the market, show a permeability to gases substantially absent (Gurley number >10,000). Besides these membranes once dehydrated are regenerable with difficulty, especially when the thicknesses are high. This is up to now an unsolved aspect which makes it difficult the fuel cells functioning.

Besides the fuel cells of the prior art use very pure hydrogen to have poisonings of the platinum-based electrodes. In fact if hydrogen from reforming, therefore containing CO, is used, a quick platinum poisoning takes place. According to the prior art the hydrogen from reforming must be purified from CO before being used in fuel cells.

The need was felt to have available hydrophilic membranes which with respect to the membranes for fuel cells of the prior art showed the following combination of properties:

improved water permeability;
absence of the phenomenon of difficult regeneration after dehydration;
a controllable porosity to gases;
a high conductivity in the cells;
possibility to operate also with hydrogen from reforming (containing CO) having a higher electrode life.

SUMMARY OF THE INVENTION

It has been surprisingly and unexpectedly found by the Applicant that it is possible to solve the above technical problem by the membranes described hereinafter.

The membranes of the invention, being characterized by a high water permeability, are particularly suitable to be used as proton exchange membranes, for example in fuel cells or in membrane reactors since the high water permeability allows to obtain improved cells. In fact it is well known that one of the most important problems for the good functioning of the fuel cell is the membrane drying at the anode side and the excessive membrane hydration from the cathode side. A better permeability of the membrane to water allows to reduce these drawbacks. Besides an improved water permeability of the membrane allows to obtain a lower resistance to proton transport of the membrane and therefore even a higher conductivity of the membrane in the cells.

An object of the present invention are porous hydrophilic membranes comprising a porous inert support on which an ionomer is deposited, said membranes being characterized in that they have an ionic conductivity in electrochemical cells and a water permeability higher than 1 $l/(h.m^2.Atm)$; the ionomer being under amorphous form and having the hydrophilic group in acid form.

The water permeability can even be higher than 10 $l/(h.m^2.Atm)$, or higher than 100 $l/(h.m^2.Atm)$, or even higher than 500 $l/(h.m^2.atm)$, in connection with the control of the membrane porosity.

DETAILED DESCRIPTION OF THE INVENTION

The water permeability is determined according to the following test: the membrane is placed on a metal plate having a diameter of 36 mm, with holes having a diameter of 0.5 mm and permeability higher than 500,000 l/(h.m².Atm), placed at the base of a vertical cylinder; 130 ml of deionized and distilled water are poured into the metal cylinder; the cylinder is closed and the internal pressure is regulated by feeding nitrogen, carrying out 4 permeation experiments at the pressures of 0.5, 1, 1.5 and 2 Atm, respectively, maintaining the pressure constant during each experiment and operating so that at the end a water head remains above the membrane; the flow-rate and then the flow for each pressure value are determined; the water volume collected for time unit and for membrane surface unit and for pressure unit is determined. Then the obtained flows and the corresponding pressures are reported in a diagram and it is determined the slope of the straight line (which represents the permeability) passing through the diagram origin point which gives the minimum mean square deviation with respect to the experimental points. The used membranes bistretched PTFE-based Goretex® having a porosity of 0.2 microns (pore average size), a thickness of 40 microns, commercialized by Gore® Germany, the membrane is treated according to the process of U.S. Pat. No. 6,179,132 or according to the process of the present invention or of the comparative Examples, the membrane having a thickness of about 40 microns.

It has been found by the Applicant that on the inert porous supports the ionomer is distributed under the form of coating on the external surfaces and on the inner walls which define the membrane interstices. S.E.M photographies show that the support porous structure even after the treatment according to the present invention remains substantially unchanged when the ionomer amount forming the coating is lower than about 20% by weight. When a membrane uses as a support a bistretched PTFE, the ionomer places itself uniformly and homogeneously on all the single fibrils and knots forming the support structure.

Depending on the application, for example if one wants to use hydrogen from reforming, it can be useful to control the membrane porosity, for example to control the gas flowing. Therefore the porous membranes of the invention can have the pores partially or totally occluded to gases, provided that there is a water permeability value higher than the above limit. The gas occlusion entity depends on the ionomer amount deposited on the support. The gas occlusion is determined according to ASTM 0726-58 and is expressed as Gurley number. When the Gurley number is higher than 10,000 the membrane is totally occluded to gases.

To obtain a porous membranes with pores completely occluded to gases, the membrane must contain an ionomer amount higher than about 30% by weight.

The porous membranes having partially occluded pores to gases contain an ionomer amount lower than about 20% by weight. The minimum ionomer amount which can be used for the membranes partially occluded to gases can also be very low, even of the order of about 0.5% by weight.

Membranes having a very high permeability contain a deposited ionomer amount from 0.5 to 10% by weight (support+ionomer).

The Applicant has found that between 20% and 30% by weight of ionomer it is possible to find membranes both partially and totally occluded to gases. According to a non binding theory this zone could be defined a transition zone.

The porous membranes of the invention having pores not completely occluded show a high gas permeability when the membrane is not wetted by water. When the membrane is wetted by water, it has been found that the gas permeability notably reduces.

It has been found that porous membranes not completely occluded to gases, when not wetted, appear opaque. It has been surprisingly found that said membranes at contact with water become much more transparent than those described in the prior art.

It has been found by the Applicant that porous membranes having pores not completely occluded to gases can usefully be employed in fuel cells when in these hydrogen from reforming is desired to be used. In this case by letting the cell function with a higher gas pressure at the cathode side (air) than that of the hydrogen at the anode, it is possible to transfer through the membrane which acts as gas diffuser a controlled oxygen amount towards the anode and in counter-current with the hydrogen from reforming (hydrogen containing CO) which is fed to the anode. In this way the oxygen reacts with the carbon oxide preventing it to poison the catalyst (for example platinum) of the hydrogen electrode. This system is clearly better than those of the prior art which introduce oxygen together with the reformed hydrogen in the fuel cell. With the membrane of the invention the electrode has a clearly higher life.

The membranes having pores completely occluded to gases can be used for example in fuel cells when hydrogen from reforming is not used.

They show in fact the following combination of properties: high water permeability combined with an improved proton exchange capability.

As porous support, any porous inert material able to give the membrane the suitable mechanical properties can be used. More preferably a porous support based on (per) fluoropolymers is used for their high chemical inertia, still more preferably, porous membranes of preferably bistretched PTFE are used.

The ionomers contained in the membrane are (per) fluorinated polymers, preferably having —$SO_3H$ and/or —COOH functionality, preferably —$SO_3H$, and an equivalent weight such as to result amorphous. The preferred ionomers comprise:

(A) monomeric units deriving from one or more fluorinated monomers containing at least one ethylene unsaturation;

(B) fluorinated monomeric units containing functional groups transformable into hydrophilic groups, preferably —$SO_2F$ and/or —COOR, —COF, wherein R is a $C_1$–$C_{20}$ alkyl radical or a $C_6$–$C_{20}$ aryl radical, in such an amount to give the above equivalent weight, the functional groups being converted into hydrophilic groups, preferably into —$SO_3H$ and/or —COOH groups in the final membrane if the functional groups were —$SO_2F$ and/or —COOR, —COF.

Preferably the fluorinated monomers of type (A) are selected from:

vinylidene fluoride (VDF);

$C_2$–$C_8$ perfluoroolefins, preferably tetrafluoroethylene (TFE);

$C_2$–$C_8$ chloro- and/or bromo- and/or iodo-fluoroolefins, such as chlorotrifluoroethylene (CTFE) and bromotrifluoroethylene;

$CF_2$=$CFOR_f$ (per) fluoroalkylvinylethers (PAVE), wherein $R_f$ is a $C_1$–$C_6$ (per) fluoroalkyl, for example trifluoromethyl, bromodifluoromethyl, pentafluoropropyl;

$CF_2$=CFOX perfluoro-oxyalkylvinylethers, wherein X is a $C_1$–$C_{12}$ perfluoro-oxyalkyl having one or more ether groups, for example perfluoro-2-propoxy-propyl.

Preferably the fluorinated monomers of type (B) are selected from one or more of the following:

$F_2C=CF-O-CF_2-CF_2-SO_2F$;
$F_2C=CF-O-[CF_2-CXF-O]_n-CF_2-CF_2-SO_2F$
  wherein X=Cl, F or $CF_3$; n=1–10;
$F_2C=CF-O-CF_2-CF_2-CF_2-SO_2F$
$F_2C=CF-Ar-SO_2F$ wherein Ar is an aryl ring;
$F_2C=CF-O-CF_2-CF_2-CF_2-COF$
$F_2C=CF-O-[CF_2-CXF-O]_n-CF_2-CFX-COF$
  wherein X=Cl, F or $CF_3$; n=1–10.

Optionally the fluorinated ionomers of the invention can contain from 0.01 to 5% by moles of monomeric units deriving from a bis-olefin of formula:

$$R_1R_2 C=CH-(CF_2)_m-CH=CR_5R_6 \quad (I)$$

wherein:

m=2–10, preferably 4–8;

$R_1$, $R_2$, $R_5$, $R_6$, equal to or different from each other, are H or $C_1$–$C_5$ alkyl groups.

The introduction as comonomer of the bis-olefin of formula (I), having a number of unsaturations higher than the unit, is advantageous since said comonomer has the purpose to pre-crosslink the ionomer during the polymerization. The bis-olefin introduction has the advantage to increase the length of the primary chains forming the final reticule.

The (per) fluorinated ionomers which cover the support interstice walls can optionally be crosslinked. This is useful to control the membrane porosity. In fact crosslinking allows to increase the ionomer amount which coates the support walls. The fluorinated ionomers of the invention are preferably used under crosslinked form in fuel cells.

Crosslinking can take place both by ionic and radical route. A mixed crosslinking can also be used. Preferably crosslinking takes place by peroxy route, wherefore the ionomers must contain radical attack sites in the chain and/or in end position of the macromolecules, for example iodine and/or bromine atoms. The radical crosslinking can take place also on the carbon atoms of the bis-olefin when the ionomer contains said unit.

Crosslinking of ionic type takes place according to known methods of the ionomer prior art. For example for the sulphonic ionomers crosslinking, a crosslinking agent is added which allows the reaction between two —$SO_2F$ groups. See patent application WO 99/38,897.

Preferably the crosslinked fluorinated ionomers of the invention comprise:

monomeric units deriving from TFE;

monomeric units deriving from $CF_2=CF-O-CF_2CF_2SO_2F$;

monomeric units deriving from the bis-olefin of formula (I);

iodine atoms in terminal position.

As regards the introduction in the chain of such iodine and/or bromine atoms, it can be carried out by addition, in the reaction mixture, of brominated and/or iodinated "cure-site" comonomers, such as bromo and/or iodo olefins having from 2 to 10 carbon atoms (as described for example in U.S. Pat. No. 4,035,565 and U.S. Pat. No. 4,694,045), or iodo and/or bromo fluoroalkylvinylethers (as described in U.S. Pat. No. 4,745,165, U.S. Pat. No. 4,564,662 and EP 199, 138), in such amounts whereby the content of "cure-site" comonomers in the final product is generally in the range 0.05–2 moles per 100 moles of the other basic monomeric units.

Alternatively or also in combination with cure-site comonomers it is possible to introduce end iodine and/or bromine atoms by addition to the reaction mixture of iodinated and/or brominated chain transfer agents, such for example the compounds of formula $R_f(I)_x(Br)_y$, wherein $R_f$ is a (per) fluoroalkyl or a (per) fluorochloroalkyl group having from 1 to 8 carbon atoms, while x and y are integers comprised between 0 and 2, with $1 \leq x+y \leq 2$ (see for example U.S. Pat. No. 4,243,770 and U.S. Pat. No. 4,943, 622). It is also possible to use as chain transfer agents iodides and/or bromides of alkaline or alkaline-earth metals, according to U.S. Pat. No. 5,173,553.

Preferably the crosslinking of radical type uses ionomers containing units of the bis-olefin of formula (I) and iodine in the end position of the macromolecules chain.

For example when the ionomer is of sulphonic type, one can crosslink by radical route at a temperature in the range 100° C.–300° C., depending on the type of the used peroxide, by addition of a suitable peroxide able to generate radicals by heating. Generally, the peroxide amount is in the range 0.1%–10% by weight with respect to the polymer. Among them it can be mentioned: dialkylperoxides, such as for example di-terbu-tyl-peroxide and 2,5-dimethyl-2,5-di (terbutylperoxy)hexane; dicumyl peroxide; dibenzoyl peroxide; diterbutyl perbenzoate; di-1,3-dimethyl-3-(terbutylperoxy)butylcarbonate. Other peroxidic systems are described, for example, in patents EP 1-36,596 and EP 410,351.

Furthermore it can be added before crosslinking:

(a) a crosslinking co-agent, in an amount in the range 0.5–10%, preferably 1–7% by weight with respect to the polymer; among them, we can mention: triallyl-cyanurate; triallyl-isocyanurate (TAIC); tris (diallylamine)-s-triazine; triallylphosphite; N,N-diallyl-acrylamide; N,N—, N',N'-tetraallyl-malonamide; trivinyl-isocyanurate; 2,4,6-trivinyl-methyltrisiloxane; N,N'bisallylbicyclo-oct-7-ene-disuccinimide (BOSA); bis olefin of formula (I), triazine;

(b) a metal compound, in amounts in the range 1–15%, preferably 2–10%, by weight with respect to the polymer, selected from oxides or hydroxides of divalent metals, such as for example Mg, Zn, Ca or Pb, optionally combined with a weak acid salt, such as for example stearates, benzoates, carbonates, oxalates or phosphates of Ba, Na, K, Pb, Ca;

(c) other conventional additives, such as thickeners, pigments, antioxidants, stabilizers and the like;

(d) inorganic or polymer reinforcing fillers, preferably PTFE, optionally fibrillable. Preferably fillers have sizes from 10 to 100 nm, preferably 10–60 nm.

When in the polymer iodine or bromine atoms are present, it is preferable at the end of the crosslinking to reduce or eliminate the residual iodine and bromine. This can be carried out for example by a thermal or chemical treatment.

The crosslinking of ionic type takes place according to methods known in the ionomer prior art. For example for the crosslinking of sulphonic ionomers a crosslinking agent is added which allows the reaction between two —$SO_2F$ groups. See patent application WO 99/38,897.

An essential feature of the invention is that an amorphous ionomer is used to allow an uniform coating of all the microstructures forming the support pores.

By amorphous ionomers, those showing a substantial absence of crystallinity are meant, i.e., at the X rays diffraction analysis, the peak at 18° at 2Θ must be absent. According to the present invention the presence of a residual crystallinity lower than 5%, preferably lower than 1% can be allowed, and anyway such that the water permeability is not lower than the above limit. In this case the crystallinity is calculated as indicated in the Examples.

Generally, the higher the amount of sulphonic groups present in the polymer chain (low equivalent weight ionomers), the better the efficiency of the ionomer in terms of ionic exchange capability in electrochemical applications. This parameter is meaningful also in terms of improved catalyst activity in catalysis applications when the membrane is used in catalytic reactions (membrane reactors). From this point of view an important parameter is the ionomer equivalent weight. The less the equivalent weight, the higher the percentage of ionic groups present in the chain. Therefore, ionomers having low equivalent weight are desirable since they give a superior application efficiency.

The membrane porosity, in addition to the crosslinking as above indicated, can also be controlled by adding in the membrane composition one or more (per) fluoropolymers. Amorphous or crystalline (per) fluoropolymers can be mentioned, the amorphous ones being different from the ionomer of the membrane of the invention. Examples of amorphous are (per) fluoroelastomers, such as copolymers TFE/(per) fluorovinylethers, TFE/VDF/HFP and/or (per) fluorovinylethers. Examples of crystalline are PVDF, PEA, MFA, FEP (optionally modified with vinylethers), PTFE. Preferably the (per) fluoropolymers are of crystalline ionomeric type.

When the membranes of the invention are used for hot operating fuel cells, at a temperature higher than the room one and up to 150° C., the fluorinated ionomers of the invention are preferably used in crosslinked form and step d) of the process as mentioned below is carried out. When the membranes of the invention are used at room or lower temperature, step d) of the process indicated below is optional.

The occluded membranes can be used also for reverse osmosis as semipermeable membranes.

A further object of the present invention is a process for preparing a hydrophilic porous membrane, comprising a porous support formed by a (per) fluorinated polymer, and amorphous (per) fluorinated ionomers, containing hydrophilic groups, preferably having —$SO_3H$ or —COOH functionality, said process comprising the following steps:

a) impregnation of the porous support formed by the (per) fluorinated polymer, with a (per) fluorinated ionomer having hydrolyzable groups, preferably —$SO_2F$, —COOR, —COF, wherein R is a $C_1$-$C_{20}$ alkyl radical or a $C_6$-$C_{20}$ aryl radical, using a solution of the ionomeric compound in fluorinated organic solvent at a concentration in the range 1–20% by weight, preferably 4–20% by weight till obtaining a membrane having the pores substantially filled by the ionomeric solution, the impregnation is carried out at temperatures comprised between the room temperature and 120° C., preferably between 15° C. and 40° C.; the so impregnated membrane is subjected to thermal treatment at temperatures from 50° to 200° C., preferably from 120° to 160° C. till substantial removal of the solvent and obtainment of a substantially transparent membrane; optionally step a) is repeated until the membrane appears substantially transparent;

b) treatment of the membrane obtained in a) with inorganic strong, preferably aqueous, alkales, i.e. bases which are completely dissociated in water, to obtain the conversion of the functional groups into hydrophilic groups, preferably from —$SO_2F$ into —$SO_3^-$, and of the —COOR, —COF groups into —$COO^-$ groups;

c) treatment of the membrane obtained in b) with inorganic strong acids, i.e. acids which are completely dissociated in aqueous solution, obtaining the (per) fluorinated ionomer in acid hydrophilic form;

d) optionally treatment with water at temperatures in the range 50° C.–100° C., optionally repeated, until removal of the ionomer in excess and neutral pH of the washing waters.

In step a) the fluorinated organic solvent must allow the complete dissolution of the fluorinated ionomer at the indicated concentrations. Examples of said solvents are methylperfluorobutylether, perfluorohexane, perfluoroheptane. Besides the solvent in step a) must have a boiling point at room pressure lower than 180° C., preferably lower than 120° C.

At the end of step a) the membrane can appear opaque or transparent. This depends on the solution viscosity, on the impregnation temperature and on the thermal treatment temperature. Step a) is repeated one or more times until a transparent membrane is obtained.

In step b) the strong alkales are preferably the hydroxides of the Group Ia metals. Generally temperatures are used such as to obtain a sufficiently rapid conversion of the ionomer functional group. The temperatures used in step b) depend on the base concentration and on the nature of the ionomer functional group. For example in the case of (per)-fluorinated ionomers having —$SO_2F$ functionality, a temperature in the range 20°–80° C., preferably 50°–80° C., is used so that the treatment times are generally comprised between 2 and 4 hours.

At the end of step b) the ionomer must not show non hydrolyzed functional groups any more. When the ionomer functional groups are —$SO_2F$, it must be verified that the —$SO_2F$ groups are absent. This can for example be checked by IR spectroscopy (signal of the —$SO_2F$ group at 1470 $cm^{-1}$). If the treatment with strong alkales is carried out on the ionomer having —COOR functionality, the ester hydrolysis can be followed with the methods known to the skilled in the field, until disappearance of the —COOR groups.

Preferably at the end of step b) washings with water are carried out till a neutral pH of the washing waters.

In step c) the treatment with strong acids leads to the complete substitution of the salified groups in the corresponding acid groups. This can be followed by titrating at intervals the membrane with a suitably diluted titrated soda solution. The temperature of step c) is not critical, but preferably one operates at room temperature. The commonly used strong acids are $H_2SO_4$, HCl, $HNO_3$.

At the end of step c), step d) is preferably carried out until a neutral pH of the washing waters is obtained. In practice for additional washings with water the membrane weight remains constant and does not release ionomer any longer. Generally said treatment is carried out for a time comprised between about 5 minutes and 4 hours.

The membranes obtainable with the process of the invention, as said above, show a substantially homogeneous coating on the whole internal and external surface of the porous support. The ionomer amount which remains under the form of coating is lower than about 20%, generally of the order from 5 to 10% with respect to the total weight ionomer+support. These porous membranes show the maximum water permeability. At the end of step d) the membranes of the invention appear transparent until they are wetted with water. By leaving the membrane at the air, this quickly dehydrates (some minutes) and becomes opaque. Under this form the membrane is notably gas permeable. However the opaque membranes, unexpectedly, at contact with water become transparent again in a very short time. Therefore the membranes of the invention do not show the dewetting phenomenon as above described.

Optionally in step a), if the ionomer has to be crosslinked, crosslinking agents (a) are added to the impregnation solution in step a) (see above). For example for the peroxidic crosslinking, peroxides and crosslinking coagents are added to the ionomer attack radicalic site containing (see above). The crosslinking is carried out after the impregnation step a), at temperatures from 100° to 300° C. For example crosslinking can take place in the oven wherein the thermal treatment is carried out as mentioned in step a); or inserting the membrane between two PTFE sheets, each having a thickness of about 100 microns, and carrying out the membrane crosslinking in press at temperatures between 100° C. and 300° C.; or in a closed autoclave at the same temperatures. At the end of the crosslinking if the membrane is not transparent, step a) (comprising the crosslinking) is repeated. When in step a) crosslinking is used, the thermal treatment indicated at the end of step a), which is carried out in this case after the crosslinking step, is optional. With crosslinking, the ionomer amount in excess which is then removed in step d) is reduced.

The membranes obtainable by carrying out the crosslinking show a water permeability lower than the porous ones, and this depends on the crosslinking entity. As extreme limit, membranes completely occluded to gases are obtained. However unexpectedly said membranes occluded to gases still show a good water permeability, higher than the above values. By the crosslinking process, the membrane porosity and therefore the water permeability can therefore be controlled. When the control of the porosity is carried out not by crosslinking but by the addition of an amorphous or crystalline (per)fluoropolymer, at the end of step d), the (per) fluoropolymer is added, dissolved in a solvent wherein it is soluble. Methods known in the prior art are used. For example if the (per) fluoropolymer is a crystalline ionomer as impregnation solution, a hydroalcoholic solution from which the alcohol is preferably removed before impregnation, can be used. See U.S. Pat. No. 6,179,132. Porous membranes having partially occluded pores and hydrophilic functions, preferably under the form of salts, for example $SO_3Li$, can be used to prepare electrodes and separators for electrochemical applications, for example in lithium batteries.

The following Examples illustrate with non limitative purposes the invention.

EXAMPLES

Determination of the Membrane Water Permeability

The membrane is set at the base of a vertical cylinder, supported by a porous metal plate with holes having diameter of 0.5 mm, the plate having diameter of 36 mm and permeability higher than 500,000 l/(h.m².Atm). The permeability of the metal plate is therefore such that the resistance opposed to the water flow is insignificant with respect to that of the membrane. The membrane is positioned in the measurement device so that it results quite flat and it is not stressed by the applied pressures. 130 ml of deionized and distilled water are poured into the metal cylinder, above the membrane. The cylinder is closed and the internal pressure is regulated by feeding nitrogen. The pressure is read on a manometer and it is maintained constant at the predetermined value by using a reducer. The water which permeates through the membrane is collected in a container placed under the cylinder. One operates so that at the end of the experiment 30 ml of water remain above the membrane, to avoid that it dehydrates. The flow-rate is determined by the weighing of the collected water and by the employed time. By dividing the flow-rate by the surface of the porous septum, the flow is determined. Measurements at 0.5, 1, 1.5 and 2 Atm, corresponding to 50 KPa, 101 KPa, 150 Kpa and 202 KPa, respectively, are carried out. The measurements are carried out when the membrane operates under stationary conditions, i.e. when the water flow and the pressure exerted on the liquid assume constant values in the time. Then the water permeability is determined, i.e. the volume collected in the unit of time, for unit of membrane surface and for unit of pressure. This parameter is determined by calculating the slope of the straight line obtained by reporting in a Cartesian diagram the flow in function of the pressure. The slope of the straight line passing through the diagram origin point is calculated; it gives the minimum mean square deviation with respect to the experimental values of the flows measured at the pressures of 0.5, 1, 1.5 and 2 atm.

Determination of the Permeability to Air (Gurley Number)

The Gurley test of permeability to air measures the time in seconds necessary to obtain the flowing of 100 ml of air under a pressure corresponding to that exerted by a 12 cm water column through a membrane having a surface of 6.45 cm² (1 sq. inch). The measure is carried out in a Gurley type porosimeter (ASTM 0726-58). The specimen is fixed above the instrument cylinder and fastened among the sealing plates. The cylinder is then let softly go down. The automatic chronometer, joined to a photoelectric cell, is used to record the time (seconds) necessary to the discharge from the cylinder of the above air volume through the membrane. This time is indicated as Gurley number.

Determination of the Ionomer Amount in the Invention Membrane

The ionomer amount now present in the tested specimen is calculated by weighing, knowing the initial weight of the membrane.

Determination of the Crystallinity of the Ionomers

The compound is prepared for the analysis by moulding a specimen having thickness of 0.3 mm, using a suitable stencil, between two steel plates coated with PTFE at 250° C. and applying a load of 16,000 kg for one minute. The specimen is quickly cooled and treated a second time under the above conditions furtherly lowering the thickness. At the end the specimen is let slowly cool in the press.

X-ray diffraction analyses are carried out on the specimen to verify if the ionomer shows the crystallinity peak, identified by the peak at 18° in 2Θ. If the crystallinity peak is absent the ionomer is amorphous. According to the present invention an ionomer which shows a crystallinity degree lower than 5% is also considered amorphous, said per cent crystallinity degree being calculated by the per cent ratio between the peak area at 18° and the areas of peaks at 18° and 16.5°:

$$\frac{A_{18°}}{A_{18°} + A_{16.5°}} \times 100$$

wherein:

$A_{18°}$ is the area of the peak at 18° in 2Θ

$A_{16.5°}$ is the area of the peak at 16.5°, which identifies the amorphous phase.

For the calculation of each area two Lorentz curves have been used since the two peaks are partially overlapped.

Example 1

Preparation of an Ionomer Having Equivalent Weight 461 q/eg

In a 2 liters autoclave, the following reactants are introduced:

850 ml of demineralized water;

74 g of the monomer of formula $CF_2=CF\!-\!O\!-\!CF_2CF_2\!-\!SO_2F$;

240 g of an aqueous solution at 5% by weight of a fluoropolyoxyalkylene having an acid end group salified with ammonium having the following formula:

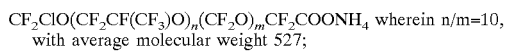
$CF_2ClO(CF_2CF(CF_3)O)_n(CF_2O)_mCF_2COONH_4$ wherein n/m=10, with average molecular weight 527;

13 ml of a solution at 33% by volume of an iodinated transfer agent of formula $I\!-\!(CF_2)_6\!-\!I$ in a perfluoropolyether solvent Galden® D02;

2 ml of a solution at 1.5% by volume of the bis-olefin of formula $CH_2=CH\!-\!(CF_2)_6\!-\!CH=CH_2$ in a perfluoropolyether solvent Galden® D02.

The mixture, maintained under stirring at 700 rpm, is heated to 60° C. Then 50 ml of an aqueous solution at a concentration of 8 g/l of ammonium persulphate (APS) are fed into the autoclave. The pressure is brought to 6 absolute atm (606 KPa) by introducing TFE. The reaction starts after 2 min. The pressure is maintained at 6 absolute atm) by feeding TFE. During ring the polymerization 19 g of the sulphonyl monomer of formula $CF_2=CF\!-\!O\!-\!CF_2CF_2\!-\!SO_2F$ and 2 ml of a solution at 1.5% by volume of the bis-olefin of formula $CH_2=CH\!-\!(CF_2)_6\!-\!CH=CH_2$ in the solvent Galden® D02 are added for each 9 g aliquot of fed TFE. The total amount of fed TFE into the reactor is 180 g. The reaction is stopped after 221 min from the starting by slackening the stirring, cooling the reactor and venting the TFE. The produced latex has a solid content of 25% by weight. The latex is coagulated by freezing, the polymer is separated from the mother liquors and dried at 100° C. for 16 h at room pressure. The copolymer composition determined by NMR is the following as per cent by moles: 75.5% of TFE and 24.5% of sulphonic monomer, corresponding to an equivalent weight of 588 g/eq. The content by weight of iodine in the ionomer, measured by X-ray fluorescence (XRF), is of 0.55%.

The ionomer is amorphous since at the X-ray analysis it does not show the crystallinity peak.

Example 2
Preparation of a Crosslinked Membrane for Fuel Cells Containing 23% by Weight of Amorphous Ionomer of Example 1

1.32 g of the ionomer obtained in Example 1 are dissolved in 26 g of methylperfluorobutylether (HFE® 7100). The ionomer solution is used to impregnate a porous PTFE membrane having a thickness of 40 µm, average pore diameter of 0.2 µm and weight of 87 mg, set on a PTFE frame having an internal diameter of 60 mm. 1 ml of ionomer solution which is homogeneously distributed on the whole surface of the membrane, is deposited on each of the two sides of the membrane. After having partially evaporated the solvent at the air, the membrane is transferred in a stove at 140° C. for 4 min. These impregnation and evaporation steps of the solvent are repeated a second time. The membrane appears transparent.

0.6 ml of a mixture of crosslinking agents obtained by mixing 6.8 g of Luperox 101 (2,5-Bis(tert-butylperoxy)-2,5-dimethylhexane), 14.9 g of bis-olefin of formula $CH_2=CH\!-\!(CF_2)_6\!-\!CH=CH_2$ and 63.9 g of HFE 7100 are then deposited on each side of the membrane; the mixture is subsequently diluted 10 times its volume with HFE 7100. After partial evaporation of the solvent at the air, the membrane is put at 170° C. for 15 min inside a closed metal vessel, placed between two plates of a press, so as to prevent the crosslinking agents to be removed by evaporation. After the crosslinking process the membrane is taken away from the frame. It appears transparent and weighs 330 mg.

The membrane is activated, i.e. the polymer sulphonyl groups $SO_2F$ are transformed into acid sulphonic groups $SO_3H$, by treating the membrane for 4 h at 70° C. in an aqueous KOH solution at 10% by weight, subsequently carrying out washings in demineralized water, and then treating for 4 h at room temperature in an aqueous HCl solution at 20% by weight and lastly washing with demineralized water.

The membrane is then maintained dipped in demineralized water for 1 h at 85° C. and dried in a stove at 100° C. The membrane weighs 113 mg, i.e. it contains 26 mg of ionomer corresponding to 23% of the membrane weight. It appears transparent at the dry state.

Gurley number: >10,000 s.

Water permeability: 25 l/(h.m².atm).

Example 3
Determination of the Membrane Performance of Example 2 in Fuel Cell The membrane is tested in a fuel cell having an active area of 10 cm² at 75° C., operating with hydrogen and air at 2.5 absolute atm on both electrodes, and humidifying the gases fed at 80° C. The density of the delivered current, measured at the voltages of 0.7 and 0.6 volt, is respectively of 0.37 A/cm² and 0.85 A/cm².

Example 4 (Comparative)
Preparation of a Crystalline Ionomer Having Equivalent Weight 748 Q/eg In a 22 liter autoclave the following reactants are introduced:

15 l of demineralized water;

480 g of the monomer of formula $CF_2=CF\!-\!O\!-\!CF_2CF_2\!-\!SO_2F$;

518 g of a microemulsion of fluoropolyoxyalkylenes previously obtained by mixing:

160.6 g of a fluoropolyoxyalkylene, having an acid end group salified with ammonium, having the formula: $CF_2ClO(CF_2CF(CF_3)O)_n(CF_2O)_mCF_2COONH_4$, wherein n/m=10, and having average molecular weight 527;

93.2 g of a perfluoropolyether oil Galden® D02 of formula $CF_3O(CF_2CF(CF_3)O)_n(CF_2O)_mCF_3$, wherein n/m=20, having average molecular weight 450;

264.2 g of water.

The mixture, maintained under stirring at 540 rpm, is heated to 75° C. Then 10 ml of an aqueous solution at a concentration of 15 g/l of ammonium persulphate (APS) are fed into the autoclave. The pressure is brought to 12 absolute atm (1212 KPa) by introducing TFE. The reaction starts after 6 min. The pressure is maintained at 12 absolute atm by feeding TFE. During the polymerization 80 g of the sulphonyl monomer of formula $CF_2=CF\!-\!O\!-\!CF_2CF_2\!-\!SO_2F$ are added for each 107 g aliquot of fed TFE. The total amount of TFE fed to the reactor is 2140 g. The reaction is stopped after 318 min from the starting by slackening the stirring, cooling the reactor and venting the TFE. The produced latex has a solid content of 18% by weight. The latex is coagulated in a solution of nitric acid 1M, and the obtained coagulum is washed until neutrality of the washing waters.

The so obtained polymer is activated as in Example 1.

Some grams of the so obtained polymer are titrated as described in Example 1. The ionomer has an equivalent weight of 748 g/eq.

The ionomer has a crystallinity of 11%.

Example 5 (Comparative)
Preparation of a Membrane for Fuel Cells Containing 22% by Weight of the Crystalline Ionomer of the Comparative Example 4

The polymer obtained in the comparative Example 4 is dissolved at a concentration of 5% by weight in a mixture formed by methanol, water and a fluoropolyether (H-Galden® degree B) in the ratios 85/11.6/3.4 by weight, according to the teaching of patent application EP 1,004, 615. The so prepared ionomer solution is used to impregnate a porous PTFE membrane having a thickness of 40 μm, average pore diameter of 0.2 μm and weight of 82 mg, set on a PTFE frame having an internal diameter of 60 mm. The membrane is dipped in the above prepared solution and put in a stove at 140° C. for 5 minutes. The dried membrane weighs 105 mg, i.e. it contains 23 mg of ionomer, corresponding to 22% of the membrane weight. It appears transparent at the dry state.

Gurley number: >10,000 s.

Water permeability: n.d.

Example 6 (Comparative)
Determination of the Membrane Performance of the Comparative Example 5 in Fuel Cell The membrane is tested in a fuel cell having an active area of 10 cm$^2$ at 75° C., operating with hydrogen and air at 2.5 absolute atm on both electrodes, and humidifying the fed gases at 80° C. The density of the delivered current, measured at the voltages of 0.7 and 0.6 volt, is respectively of 0.21 A/cm$^2$ and 0.52 A/cm$^2$, therefore said current densities are respectively, as average value, lower than about 40% both at 0.7 volt and at 0.6 volt.

Example 7
Preparation of an Ionomer Having Equivalent Weight 524 q/eg

In a 2 liter autoclave the following reactants are introduced:

850 ml of demineralized water;

74 g of the monomer of formula $CF_2=CF-O-CF_2CF_2-SO_2F$;

240 g of an aqueous solution at 5% by weight of a fluoropolyoxyalkylene having an acid end group salified with ammonium ion having the formula: $CF_2ClO(CF_2CF(CF_3)O)_n(CF_2O)_mCF_2COONH_4$, wherein n/m=10, and having average molecular weight 527;

6.5 ml of a solution at 33% by volume of an iodinated transfer agent of formula $I-(CF_2)_6-I$ in a perfluoropolyether solvent Galden® D02;

2 ml of a solution 1.5% by volume of the bis-olefin of formula $CH_2=CH-(CF_2)_6-CH=CH_2$ in a perfluoropolyether solvent Galden® D02.

The mixture, maintained under stirring at 700 rpm, is heated to 60° C. Then 50 ml of an aqueous solution at a concentration of 16 g/l of ammonium persulphate (APS) are fed into the autoclave. The pressure is brought to 5 absolute atm (505 KPa) by introducing TFE. The reaction starts after 14 min. The pressure is maintained at 5 absolute atm by feeding TFE. During the polymerization 17 g of the sulphonyl monomer of formula $CF_2=CF-O-CF_2CF_2-SO_2F$ and 2 ml of a solution 1.5% by volume of the bis-olefin of formula $CH_2=CH-(CF_2)_6-CH=CH_2$ in the solvent Galden® D02 are added for each 8 g aliquot of fed TFE. The total amount of TFE fed to the reactor is 160 g. The reaction is stopped after 296 min from the starting by slackening the stirring, cooling the reactor and venting the TFE. The produced latex has a solid content of 25% by weight. The latex is coagulated by freezing, the polymer is separated from the mother liquors and dried at 100° C. for 16 h at room pressure. The polymer composition determined by NMR, as per cent by moles is the following: 70.9% of TFE and 29.1% of sulphonic monomer, corresponding to an equivalent weight of 524 g/eq. The content by weight of iodine in the ionomer, measured by X-ray fluorescence (XRF), is of 0.30%.

The ionomer is amorphous since at X rays analysis the crystallinity peak is not noticed.

Example 8
Preparation of a Crosslinked Porous Membrane Containing an Ionomer Amount of Example 7 in an Amount Equal to 13% by Weight.

29.9 g of the ionomer having equivalent weight 524 g/eg are dissolved in 433 g of methylperfluorobutylether (HFE 7100). The so prepared ionomer solution is used to impregnate a porous PTFE membrane having a thickness of 40 μm, porosity (average pore diameter) of 0.2 μm and weight of 111 mg, set on a PTFE frame having an internal diameter of 60 mm. The membrane is impregnated with the solution on each side depositing thereon a solution head. Subsequently it is vertically set for some seconds to remove the impregnating solution excess from the surface and put in a stove at 100° C. for 5 min. The impregnation step, including the passage in the stove, is repeated twice, obtaining a transparent membrane.

1.6 ml of a mixture of crosslinking agents obtained by mixing 6.8 g of Luperox 101 (2,5-Bis(tert-butylperoxy)-2, 5-dimethylhexane), 14.9 g of bis-olefin of formula $CH_2=CH-(CF_2)_6-CH=CH_2$ and 63.9 g of HFE 7100 are then deposited on each side of the membrane; the mixture is subsequently diluted 10 times its volume with HFE 7100. After partial evaporation of the solvent at the air, the membrane is put at 170° C. for 15 min inside a closed metal vessel, placed between two plates of a press, so as to prevent the crosslinking agents to be removed by evaportion. After the crosslinking process the membrane is taken away from the frame. It appears transparent and weighs 429 mg. The membrane is activated as described in Example 2.

The membrane is then maintained dipped in demineralized water for 1 h at 85° C. and dried in a stove at 100° C. The membrane weighs 128 mg, i.e. it contains 17 mg of ionomer corresponding to 13% of the membrane weight (support+ionomer). It appears white at the dry state and transparent when wetted with water.

Gurley number: >232 s.

Water permeability: 350 l/(h.m$^2$.atm).

Example 9
Determination of the Membrane Performance of Example 8 in Fuel Cell The membrane is tested in a fuel cell having an active area of 10 cm$^2$ at 75° C., operating with hydrogen and air at 2.5 absolute atm on both electrodes, and humidifying the gases fed at 80° C. The density of the delivered current, measured at the voltages of 0.7 and 0.6 volt, is respectively of 0.21 A/cm$^2$ and 0.57 A/cm$^2$.

This membrane shows current density at the two tested voltages, equal to or higher than those of the membrane of the comparative Example 6, even though it has a lower ionomer content (in the membrane of the comparative Example 6 the ionomer content is 22%) and even though it is porous to gases on the basis of the Gurley test.

This is surprising since according to the prior art a membrane in order to function in fuel cells must guarantee a substantial impermeability to gases and therefore give a Gurley number >10,000. The density of the delivered current using the membrane of the present Example in the fuel cell shows that under the working conditions the membrane behaves even better than that of the comparative Example 6 which has a very high Gurley number. Therefore under the working conditions in the fuel cell also the membrane of the present Example is substantially impermeable to gases.

What is claimed is:

1. Porous hydrophilic membranes comprising a porous inert support on which an ionomer is deposited, said membranes being characterized in that they have an ionic conductivity in electrochemical cells and a water permeability higher than 1 l/(h.m$^2$.Atm); the ionomer being under amorphous form and having the hydrophilic group in the acid form.

2. Membranes according to claim 1, having pores partially or totally occluded to gases.

3. Membranes having pores totally occluded to gases according to claim 1, containing an ionomer amount higher than about 30% by weight.

4. Membranes having pores partially occluded to gases according to claim 1, containing an ionomer amount lower than about 20% by weight.

5. Membranes according to claim 1, wherein the porous support is formed by (per)fluoropolymers, preferably PTFE, still more preferably bistretched PTFE.

6. Membranes according to claim 1, wherein the ionomers are (per)fluorinated polymers and they optionally have $SO_3H$ and/or —COOH, and or $SO_3H$, functionality, and an equivalent weight such as to result amorphous.

7. Membranes according to claim 6, wherein the ionomers comprise:
(A) monomeric units deriving from one or more fluorinated monomers containing at least one ethylene unsaturation;
(B) fluorinated monomeric units containing functional groups transformable into hydrophilic groups preferably —$SO_2F$ and/or COOR, COF, wherein R is a $C_1$–$C_{20}$ alkyl radical or a $C_6$–$C_{20}$ aryl radical, in such an amount to give the above equivalent weight, the functional groups being converted into hydrophilic groups, or into —$SO_3H$ and/or —COOH groups in the final membrane if the functional groups were —$SO_2F$ and/or —COOR, —COF.

8. Membranes according to claim 7, wherein the fluorinated monomers of type (A) are selected from the following:
vinylidene fluoride (VDF);
$C_2$–$C_8$ perfluoroolefins, or tetrafluoroethylene (TFE);
$C_2$–$C_8$ chloro- and/or bromo- and/or iodo-fluoroolefins, and/or chlorotrifluoroethylene (CTFE) and/or bromotrifluoroethylene;
$CF_2$=$CFOR_f$ (per) fluoroalkylvinylethers (PAVE), wherein $R_f$ is a $C_1$–$C_6$ (per) fluoroalkyl, or trifluoromethyl, bromodifluoromethyl, or pentafluoropropyl;
$CF_2$=CFOX perfluoro-oxyalkylvinylethers, wherein X is a $C_1$–$C_{12}$ perfluoro-oxyalkyl having one or more ether groups, or perfluoro-2-propoxy-propyl.

9. Membranes according to claim 7, wherein the fluorinated monomers of type (B) are selected from the following:
$F_2C$=CF—O—$CF_2$—$CF_2$—$SO_2F$;
$F_2C$=CF—O—[$CF_2$—CXF—O]$_n$—$CF_2$—$CF_2$—$SO_2F$ wherein X=Cl, F or $CF_3$; n=1–10;
$F_2C$=CF—O—$CF_2$—$CF_2$—$CF_2$—$SO_2F$
$F_2C$=CF—Ar—$SO_2F$ wherein Ar is an aryl ring;
$F_2C$=CF—O—$CF_2$—$CF_2$—$CF_2$—COF
$F_2C$=CF—O—[$CF_2$—CXF—O]$_n$—$CF_2$—CFX—COF wherein X=Cl, F or $CF_3$; n=1–10.

10. Membranes according to claim 1, wherein the ionomers contain from 0.01 to 5% by moles of monomeric units deriving from a bis-olefin of formula:

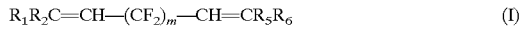

$$R_1R_2C=CH-(CF_2)_m-CH=CR_5R_6 \qquad (I)$$

wherein:
m=2–10, preferably 4–8;
$R_1$, $R_2$, $R_5$, $R_6$, equal to or different from each other, are H or $C_1$–$C_5$ alkyl groups.

11. Membranes according to claim 1, wherein the ionomers comprise:
monomeric units deriving from TFE;
monomeric units deriving from $CF_2$=CF—O—$CF_2CF_2SO_2F$;
monomeric units deriving from the bis-olefin of formula (I);
iodine atoms in end position.

12. Membranes according to claim 1, wherein the amorphous ionomer shows a substantial absence of crystallinity.

13. Membranes according to claim 1, wherein the amorphous ionomer has a residual crystallinity lower than 5%.

14. Membranes according to claim 1, wherein the (per) fluorinated ionomers are crosslinked.

15. Membranes according to claim 1, containing one or more amorphous or crystalline (per)fluoropolymers, the amorphous ones being different from the ionomer used in the membrane.

16. Membranes according to claim 15, wherein the (per) fluoropolymers are of crystalline ionomeric type.

17. Electrochemical cells operated by the membranes of claim 1.

18. Fuel cells operated by the membranes of claim 1.

19. Fuel cells according to claim 18, wherein the membranes have pores partially occluded to gases, and certain ionomer amount lower than about 20% by weight, and wherein the air pressure at the cathode side is higher than that of the hydrogen at the anode side, the fed hydrogen coming from reforming.

20. A process for preparing hydrophilic porous membranes according to claim 1, comprising a porous support formed by a (per)fluorinated polymer, and amorphous (per) fluorinated ionomers containing hydrophilic groups, preferably having a —$SO_3H$ or —COOH functionality, said process comprising the following steps:
a) impregnation of the porous support formed by the (per)fluorinated polymer, with a (per)fluorinated ionomer having hydrolyzable functions, preferably —$SO_2F$, —COOR, —COF, wherein R is a $C_1$—$C_{20}$ alkyl radical or a $C_6$–$C_{20}$ aryl radical, using a solution of the ionomeric compound in fluorinated organic solvent at a concentration in the range 1–20% by weight until obtaining a membrane having the pores substantially filled by the ionomeric solution, the impregnation is carried out at temperatures between the room temperature and 120° C.; the so impregnated membrane is subjected to thermal treatment at temperatures from 50° to 200° C., until substantial removal of the solvent and obtainment of a substantially transparent membrane, optionally step a) is repeated until the membrane appears substantially transparent;
b) treatment of the membrane obtained in a) with inorganic strong, optionally aqueous, alkalis, or bases which are completely dissociated in water, to obtain the conversion of the functional groups into hydrophilic groups, optionally from —$SO_2F$ into —$SO_3^-$, and of the —COOR, —COF groups into —$COO^-$ groups;

c) treatment of the membrane obtained in b) with inorganic strong acids, or acids which are completely dissociated in aqueous solution, obtaining the (per) fluorinated ionomer in acid hydrophilic form;

d) optionally treatment with water at temperatures in the range 50° C.–100° C., in case repeated, until removal of the ionomer in excess and neutral pH of the washing waters.

21. A process according to claim 20, wherein in step a) the solvent has a boiling point at room pressure lower than 180° C.

22. A process according to claim 20, wherein in step b) the used strong alkales are the hydroxides of the Group Ia metals.

23. A process according to claim 20, wherein at the end of step b) washings with water are carried out until a neutral pH of the washing waters is obtained.

24. A process according to claim 20, wherein the ionomer is crosslinked by adding to the impregnation solution a) crosslinking agents.

25. A process according to claim 24, wherein crosslinking takes place by adding peroxides to the impregnation solution and operating at temperatures from 100 to 300° C.

* * * * *